United States Patent [19]
Prout

[11] 3,777,335
[45] Dec. 11, 1973

[54] STRAP AND CABLE COUPLING AND INTERCONNECTING SYSTEM EMPLOYING SUCH COUPLING

[75] Inventor: Wesley C. Prout, St. Anne, Ill.
[73] Assignee: Park, Davis & Company, Detroit, Mich.
[22] Filed: Aug. 24, 1972
[21] Appl. No.: 283,584

[52] U.S. Cl. ............... 24/79, 24/265 CC, 287/82
[51] Int. Cl..... A44b 21/00, A44c 5/18, F16g 11/02
[58] Field of Search .............. 24/73 R, 79, 265 CC, 24/265 EE, 265 EC, 265 R, 265 BC, 73 PH; 287/80, 81, 82

[56] References Cited
UNITED STATES PATENTS

| 2,255,258 | 9/1941  | Lethern et al. ....................... 24/205 |
| 2,672,309 | 3/1954  | Hatfield ............................. 244/151 |
| 304,840   | 9/1884  | McIver ................................ 24/79 |
| 455,411   | 7/1891  | Plumb ................................ 24/79 |
| 2,571,052 | 10/1951 | Mount .............................. 287/82 |
| 3,656,210 | 4/1972  | Parker et al. .................. 24/265 CC |

OTHER PUBLICATIONS
Hosmer Newsletter 1963 24–73 PH Northwestern Ring Type Harness.

Primary Examiner—Donald A. Griffin
Attorney—Robert L. Parker et al.

[57] ABSTRACT

A strap and cable coupling. A buckle part is formed of a planar member with at least three substantially parallel elongated openings spaced apart and extending through the planar member for receiving such strap. The center of elongation of each of the openings is positioned along an axis. A cable connecting part includes a semi-circular receptacle integrally formed on the member at an edge thereof and at a position substantially intersecting the axis. The receptacle has an exterior extending opening. The cable connecting part also includes a ball portion rotatably mounted in the receptacle and is adapted to be connected to the cable. The receptacle forms an interference so as to retain the ball therein. Preferably, the coupling is part of an interconnecting system and includes a strap and a cable. The cable is affixed to the ball and the strap passes serially through all three openings, beginning at a first opening which is furthest removed from the member edge and then loops back through the first opening.

5 Claims, 1 Drawing Figure

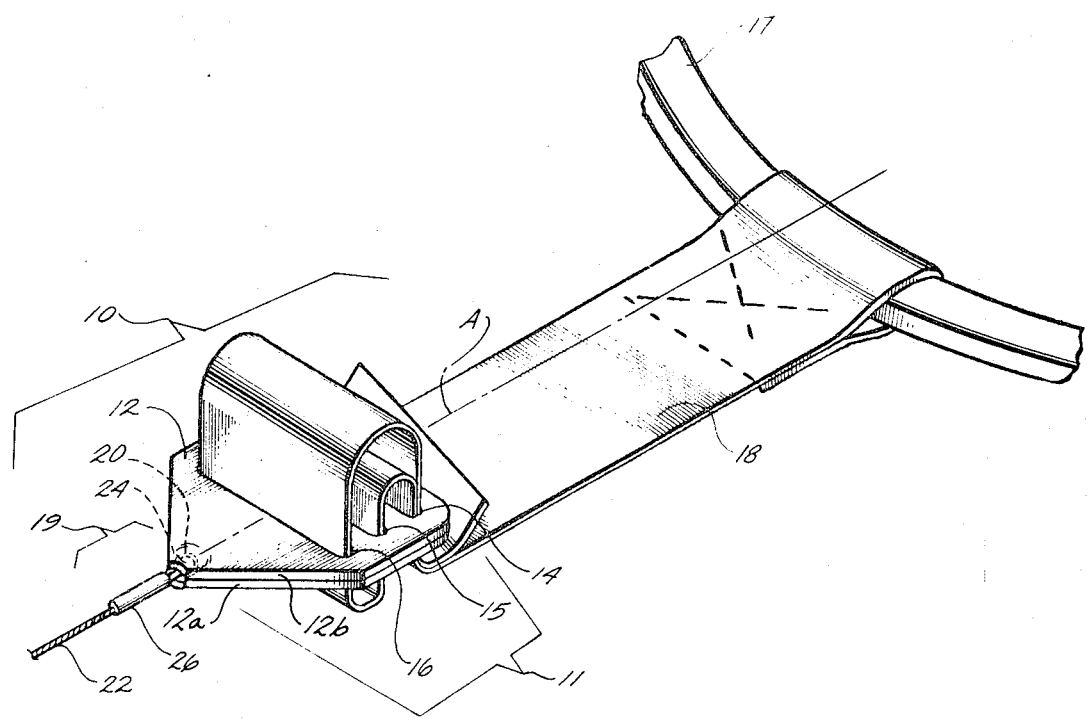

STRAP AND CABLE COUPLING AND INTERCONNECTING SYSTEM EMPLOYING SUCH COUPLING

BACKGROUND OF THE INVENTION

This invention is related to a strap and cable coupling and to an interconnecting system employing such coupling for use in a prosthetic or orthotic system.

Interconnecting systems are commonly employed in prosthetic and orthotic systems for connecting prosthetic and orthotic devices to a patient and for coupling to a control member or the like for the prosthetic or orthotic device.

However, known systems are cumbersome and difficult to use and/or quite expensive. Once such system was developed at the Northwestern University Research Center. The system consists of a stainless ring that serves as a distribution point for four straps of a figure 8 harness. A four-bar type of buckle is used as the interconnecting link in between the ring and a control cable to a prosthetic device. In the system, a strap extends between the ring and an end opening in the four-bar buckle and the strap is stitched together to retain the buckle and ring. A special cable coupling member is provided in between the cable and the four-bar buckle. The cable coupling has a semi-circular receptacle at an edge and the cable has a tubular-shaped portion affixed to a ball. The ball extends into the receptacle and the receptacle forms an interference, holding the ball in place. Opposite from the receptacle is a rectangular-shaped loop affixed to the cable coupling. An extension of the aforementioned strap extends through the ring and back serially through the openings of the four-bar buckle to provide an adjustable connection between the cable coupling and the four-bar buckle.

With the foregoing arrangement, a separate cable coupling and strap buckle are required for the interconnecting system. As a result, the system is costly and difficult for the patient and technician to work with. Additionally, the unwieldy separate parts are unsightly.

SUMMARY OF THE INVENTION

Briefly, the present invention is directed to a coupling for a strap and a cable. A buckle part is provided having a planar member. At least three substantially parallel elongated openings are spaced apart and extend through the planar member for receiving the strap. The center of elongation of each of the openings is positioned along an axis. A cable connecting part includes a semi-circular receptacle integrally formed at an edge of the planar member at a position substantially intersecting the axis. The receptacle has an exterior extending opening. The cable connecting part also includes a ball rotatably mounted in the receptacle. The ball is adapted to be connected to the cable and the receptacle forms an interference so as to retain the ball therein. With such an arrangement, a strap can be connected directly between the ring in the aforementioned prior art system and the cable, thereby eliminating the separate cable coupling piece of hardware and thereby eliminating the aforementioned disadvantages of the prior art system.

Preferably, the coupling has a tubular portion affixed to the ball and extends out of the opening for connection to a cable.

A preferred embodiment of the present invention is in an interconnecting system where the strap passes serially through all three openings, beginning at a first opening which is furthest removed from the aforementioned edge and then loops back through the first opening. According to a further preferred embodiment of the invention, the planar member is formed of a pair of substantially identical plates aligned in parallel abutting relation and rigidly affixed together.

BRIEF DESCRIPTION OF THE DRAWING

The drawing depicts a pictorial view of an interconnecting system and embodying the present invention.

DESCRIPTION OF THE PREFERRED EMBODIMENT

According to the preferred embodiment of the invention shown in the drawing, an interconnecting system is disclosed. A substantially flat strap 18 is coupled between a ring 17 and a control cable 22 in a prosthetic system of the type disclosed hereinabove. The control cable 22 is a circular metal wire strand cable well known in the prosthetic art and the strap is preferably of the Dacron tape type.

Provided in between the strap 18 and the control cable 22 is a strap to cable coupling 10. The coupling 10 includes a buckle part 11 and a cable connecting part 19.

The buckle part 11 includes a planar member 12 having three substantially parallel elongated openings 14, 15 and 16 which are spaced apart and extend through the planar member for receiving the strap 18. The center of elongation of the openings are positioned along an axis A. A cable connecting part 19 is provided for connecting to the control cable 22. The cable connecting part includes a semi-circular receptacle 20 and a ball portion 24. The ball portion 24 is rotatably mounted in the receptacle 20 and is adapted to be connected to the control cable 22 by a tubular portion 26 which is affixed to the ball portion 24. The control cable 22 extends into the interior of the tubular-shaped portion 26 where it is affixed by crimping, welding, or other well known techniques. The receptacle 20 has an opening extending to the exterior of the planar member 12, allowing the tubular portion 26 to extend out thereof.

Preferably, the planar member 12 is formed of a pair of substantially identical plates 12a and 12b which are aligned in parallel abutting relation and are rigidly affixed thereto by welding or other well known techniques. The openings 14, 15 and 16 extend through both of the plates. The receptacle 20 is formed of oppositely and outwardly bulging semi-circular portion in the pair of plates 12a and 12b.

The strap 18 is affixed to the buckle portion 11 by passing serially through all three of the openings 14, 15 and 16, beginning at the first opening 14 which is furthest removed from the edge at which the receptacle 20 is positioned and looping back and through the first opening 14.

Although an exemplary embodiment of the invention has been disclosed for pusposes of illustration, it will be understood that various changes, modifications and substitutions may be incorporated in such embodiment without departing from the spirit of the invention as defined by the claims appearing hereinafter.

I claim:

1. A strap and cable coupling comprising:
   a buckle part having a pair of substantially identical plates, said plates having planar surfaces aligned in parallel abutting relation and rigidly affixed together, at least three substantially parallel elongated openings spaced apart and extending through both plates for receiving such strap, the center of the elongation of each of said openings being positioned along an axis; and a cable connecting part comprising:

a receptacle comprising oppositely and outwardly bulging semi-circular portions on each of said plates positioned along an edge of each plate at a position intersecting such axis, the receptacle having an opening to the exterior of said plates; and a tubular portion for receipt of such cable and a ball portion affixed to said tubular portion, said ball portion being rotatably mounted in said receptacle, said tubular portion extending out of said receptacle opening and said semi-circular portions forming an interference so as to retain said ball in said receptacle.

2. A strap and cable coupling comprising:

a planar member; a buckle connector part comprising:

at least three substantially parallel elongated openings spaced apart and extending through said planar member for receiving such strap, the center of the elongation of each of said openings being positioned along an axis; and a cable connecting part comprising:

a semi-circular receptacle integrally formed in said planar member at an edge of said planar member substantially intersecting such axis, the receptacle having an exterior extending opening; and a ball portion rotatably mounted in said receptacle adapted to be connected to such cable, said receptacle forming an interference so as to retain said ball therein.

3. A coupling according to claim 2 wherein said cable connecting part comprises a tubular portion affixed to said ball and extending out of said opening.

4. An interconnecting system comprising a substantially flat, elongated strap. a substantially circular cable, and a strap and cable coupling, the coupling comprising:

a buckle part having a pair of substantially identical plates aligned in parallel abutting relation and rigidly affixed together, at least three substantially parallel elongated openings spaced apart and extending through both plates, the center of the elongation of said openings being positioned along an axis; and a cable connecting part comprising:

a receptacle comprising an oppositely and outwardly bulging semi-circular portion in each of said plates positioned along an edge of each plate at a position intersecting such axis, the receptacle having an opening to the exterior of said plates, and a tubular portion into which said cable extends and is affixed and a ball portion affixed to said tubular portion, said ball portion being rotatably mounted in said receptacle and said tubular portion extending out of said receptacle opening, said semi-circular portions forming an interference so as to retain said ball in said receptacle, said strap passing serially through all three openings beginning at a first opening, which is furthest removed from said edges and then looping back and through said first opening.

5. An interconnecting system comprising a substantially flat, elongated strap, a substantially circular cable, and a strap and cable coupling, the coupling comprising:

a buckle part comprising:

a planar member, at least three substantially parallel elongated openings spaced apart and extending through said planar member for receiving a strap, the center of the elongation of said openings being positioned along an axis; and a cable connecting part comprising:

a semi-circular receptacle integrally formed in said planar member at an edge of said planar member substantially intersecting such axis, the receptacle having an exterior extending opening; and a ball portion affixed to said cable, said ball portion being rotatably mounted in said receptacle and said cable extending out of said receptacle opening, said receptacle forming an interference so as to retain said ball therein, said strap passing serially through all three openings beginning at a first opening, which is furthest removed from said edge and then looping back and through said first opening.

* * * * *

PO-1050
(5/69)

UNITED STATES PATENT OFFICE
CERTIFICATE OF CORRECTION

Patent No. __3,777,335__   Dated __December 11, 1973__

Inventor(s) __Wesley C. Prout__

It is certified that error appears in the above-identified patent and that said Letters Patent are hereby corrected as shown below:

On the title page, the assignee should read --Parke, Davis & Company.

Col. 3, line 44, after "strap" there should be a comma;

Col. 3, line 24, "a planar member" should be after line 25.

Signed and sealed this 19th day of November 1974.

(SEAL)
Attest:

McCOY M. GIBSON JR.
Attesting Officer

C. MARSHALL DANN
Commissioner of Patents